United States Patent
Gibson et al.

(10) Patent No.: US 10,532,303 B2
(45) Date of Patent: Jan. 14, 2020

(54) CERAMIC FILTERS

(71) Applicant: Pyrotek Incorporated, Spokane, WA (US)

(72) Inventors: Jeff Gibson, Spokane, WA (US); Steven Ray, Au (AU)

(73) Assignee: Pyrotek Incorporated, Spokane, WA (US)

( * ) Notice: Subject to any disclaimer, the term of this patent is extended or adjusted under 35 U.S.C. 154(b) by 576 days.

(21) Appl. No.: 14/776,588

(22) PCT Filed: Mar. 11, 2014

(86) PCT No.: PCT/US2014/023436
§ 371 (c)(1),
(2) Date: Sep. 14, 2015

(87) PCT Pub. No.: WO2014/150503
PCT Pub. Date: Sep. 25, 2014

(65) Prior Publication Data
US 2016/0038866 A1   Feb. 11, 2016

Related U.S. Application Data

(60) Provisional application No. 61/800,065, filed on Mar. 15, 2013.

(51) Int. Cl.
*B01D 63/00* (2006.01)
*B01D 39/20* (2006.01)
(Continued)

(52) U.S. Cl.
CPC ..... *B01D 39/2075* (2013.01); *B01D 39/2093* (2013.01); *B28B 1/001* (2013.01);
(Continued)

(58) Field of Classification Search
USPC .... 264/41, 42, 43, 44, 45.1, 45.2, 46.4, 603, 264/628, 629, 630, 651, 652, 653, 654,
(Continued)

(56) References Cited

U.S. PATENT DOCUMENTS 5,221,479 A * 6/1993 Etoh .................... B01D 61/147
210/636
5,714,103 A 2/1998 Bauer et al.
(Continued)

FOREIGN PATENT DOCUMENTS

CN         1718325       1/2006
CN       101745972       6/2010
(Continued)

OTHER PUBLICATIONS

Yong et al., "Research Development of Rapid Prototyping Manufacturing Technology in Formation of Ceramics Product", Journal of Shanxi University of Science of Technology, No. 5 Oct. 2004, China, pp. 148-152—Abstract Only.
(Continued)

*Primary Examiner* — Allison G Fitzsimmons
(74) *Attorney, Agent, or Firm* — Wells St. John P.S.

(57) ABSTRACT

Additively manufactured ceramic filters are disclosed. A plurality of pores, each having a uniform geometry, are arranged between an inlet surface and an outlet surface of a single unit of ceramic such that the plurality of pores change in size uniformly from the inlet surface to the outlet surface. The pores are respectively interconnected, and the size, shape, orientation, and/or interconnection of the pores are chosen to provide hydrodynamic features that provide effective filtration for a given liquid and contamination. The pores are additively manufactured with optimized precision.

7 Claims, 9 Drawing Sheets

(51) Int. Cl.
  *B28B 1/00* (2006.01)
  *C04B 38/00* (2006.01)
  *C22B 9/02* (2006.01)
  *B01D 69/00* (2006.01)
  *B33Y 10/00* (2015.01)
  *B33Y 80/00* (2015.01)
(52) U.S. Cl.
  CPC .......... *C04B 38/0038* (2013.01); *C22B 9/023* (2013.01); *B01D 2239/10* (2013.01); *B33Y 10/00* (2014.12); *B33Y 80/00* (2014.12)
(58) Field of Classification Search
  USPC ...... 264/112, 113; 210/500.1, 500.21, 510.1; 442/56; 428/43, 116, 118, 220
  See application file for complete search history.

(56) References Cited

U.S. PATENT DOCUMENTS

| | | |
|---|---|---|
| 5,989,420 A | 11/1999 | Sugimoto |
| 6,215,093 B1 | 4/2001 | Meiners et al. |
| 6,651,012 B1 | 11/2003 | Bechhoefer |
| 9,278,465 B1 | 3/2016 | Worsley et al. |
| 9,458,523 B2 | 10/2016 | Olson et al. |
| 2009/0200236 A1 | 8/2009 | Diefenbacher et al. |
| 2010/0011726 A1 | 1/2010 | Ishikawa |
| 2010/0025324 A1 | 2/2010 | Komiyama et al. |
| 2011/0290715 A1 | 12/2011 | Mattern et al. |
| 2012/0144958 A1 | 6/2012 | Olson et al. |
| 2013/0062275 A1 | 3/2013 | Kobashi et al. |

FOREIGN PATENT DOCUMENTS

| | | |
|---|---|---|
| JP | 2010-36204 | 2/2010 |
| WO | WO93/16865 | 9/1993 |
| WO | WO2004/050214 | 6/2004 |
| WO | WO2010/086327 | 8/2010 |

OTHER PUBLICATIONS

Zhao et al. "Progress on Rapid Prototyping of Ceramic Parts by Selective Laser Sintering", Journal of Inorganic Materials, vol. 19, No. 4, Jul. 2004, China, pp. 705-713 Abstract Only.

* cited by examiner

CERAMIC FILTERS

CROSS REFERENCE TO RELATED APPLICATION

This is a 35 U.S.C. § 371 application of and claims priority to International Application No. PCT/US2014/23436, which was filed on Mar. 11, 2014, and which claims priority to U.S. Provisional Application No. 61/800,065, filed on Mar. 15, 2013, and the teachings of all the applications are incorporated herein by reference.

BACKGROUND

Ceramic foam filters (CFF) formed from reticulated polyurethane foam exist. These CFFs are formed by impregnating the reticulated polyurethane foam with a ceramic slip, removing the excess slip by squeezing the foam, and then drying and firing the body, forming a CFF.

However, these CFFs create a number of problems in the production of the CFFs and in the application of the CFFs. In the production of CFFs, because the CFFs are formed via reticulated polyurethane foam, a precise pore size and shape of the reticulated polyurethane foam is difficult to control. One difficulty is controlling the pore size and shape of one batch of reticulated polyurethane foam to another pore size and shape of another batch of reticulated polyurethane foam. Additionally, the reticulated polyurethane foam offers only one pore size and shape across a cross-section of the CFFs. For example, the reticulated polyurethane foam offers a single pore size and shape relative to a depth of the CFFs. Stated otherwise, the reticulated polyurethane foam offers a single pore size and shape along a direction of flow of a liquid flowing through the CFFs.

In another example of the difficulty in producing CFFs, because the underlying reticulated polyurethane foam is ablated or burnt away, the CFFs are weak or brittle and the polyurethane foam is detrimentally lost to the environment. For example, the ablated reticulated polyurethane foam is exhausted out from the ceramic encasing the underlying reticulated polyurethane foam which produces undesirable whiskers of the ceramic. The undesirable whiskers break off from the CFFs, producing debris. In another example, the ablated reticulated polyurethane foam produces a hollow core of the ceramic. For example, the ablated reticulated polyurethane foam leaves a void in the ceramic. The hollow core of the ceramic weakens the resulting CFFs.

In another example of the difficulty in producing CFFs, because the polyurethane foam is impregnated with a ceramic slip, the polyurethane foam is limited to a maximum height or thickness (e.g., a maximum height of about 50 millimeters). For example, the polyurethane foam is limited to a maximum height because the ceramic slip must be able to be dispersed throughout the entire body of polyurethane foam, and subsequently able to be removed from the entire body of polyurethane foam, by squeezing the polyurethane foam.

CFFs formed of multiple layers of polyurethane foam are possible, but have distinct interfaces between each layer. For example, a first layer having a first pore size and shape may be fixed to, and interface with, a second layer having a second pore size and shape. However, the interface between the two different layers produces an irregularity that reduces a performance of the multiple layered CFFs. In addition to the interface irregularity, multiple layered CFFs are difficult to produce and are expensive.

In the application of CFFs, because the CFFs are weak or brittle the CFFs are difficult to replace. For example, in molten aluminium casting using CFFs, a new or unused CFF is installed in a filter box, one-drop or dose of molten aluminium is filtered through the CFF, and subsequent to the one-drop of molten aluminium the used or spent CFF is removed. Because the CFFs are weak or brittle, it is difficult for a user to remove them from the filter box after the one-drop of molten aluminium. For example, a user may attempt to grasp the spent CFF with a tool (e.g., tongs, pliers, skewers, etc.) to remove the CFF, but because the CFF is weak the CFF may break apart into multiple fragments due to a force applied to the CFF by the tool, making removal of the CFF difficult.

In another example of difficulty in applying CFFs, because the CFFs have a single pore size the process of casting molten aluminium using CFFs is strictly controlled to optimize filtration efficiency. For example, because of fine pore filtration (e.g., up to 80 grade) and high metal flow rates (e.g., up to 19 millimeters/second) demanded by the industry of molten aluminium casting, operating parameters of the filter systems (e.g., filter system preheating, filter system bowl design, filter system bowl sizing, etc.) are strictly controlled to ensure optimal filtration efficiency is achieved. In addition, the correct CFF size and grade is strictly controlled to ensure optimal filtration efficiency is achieved.

In addition to CFFs, other ceramic filters exist. However, the other ceramic filters have disadvantages. For example, deep or packed bed filters exist that offer medium to high efficiencies, but are very large and expensive to maintain compared to CFFs. In another example, bonded particle tube filters exist that offer very high filtration efficiencies, but are very large, have very expensive filtration media, and require long pre-heat times. In comparison, CFFs systems provide medium to high filtration efficiency, are compact, use lower cost filtration media (i.e., low cost CFFs), and have rapid pre-heat times. Subsequently, filtration of aluminium with CFFs in a casthouse has become the standard throughout the industry of molten aluminium casting to meet demand for an ever-increasing quality of semi-finished wrought aluminium products.

Thus, there remains a need to develop new ceramic filters, not formed from reticulated polyurethane foam.

BRIEF SUMMARY

This Brief Summary is provided to introduce simplified concepts relating to techniques for manufacturing ceramic filters, such as molten metal filters, comprising optimized pores, which are further described below in the Detailed Description. This Summary is not intended to identify essential features of the claimed subject matter, nor is it intended for use in determining the scope of the claimed subject matter.

This disclosure relates to additively manufactured filters and techniques for manufacturing such filters. In some embodiments, such additively manufactured filters may be formed of a ceramic and configured to filter molten metal (e.g., molten aluminium).

In some embodiments, the additively manufactured ceramic filters may include a plurality of pores or openings arranged between an inlet surface and an outlet surface of a single unit of ceramic. For example, the plurality of pores may be arranged between the inlet surface and the outlet surface such that the plurality of pores change in size uniformly from the inlet surface to the outlet surface. Moreover, a size, shape, and/or orientation of the pores may be chosen to provide effective depth filtration for a given liquid and contamination. For example, the size, shape, and/or orientation of the pores may be chosen to provide hydrodynamic features (e.g., laminar flow, turbulent flow, vortexes, eddies, etc.) that provide effective depth filtration for a given liquid and contamination. Depth filtration is where the captured kinetics are more suited to removing smaller inclusions with lower inclusion loads within the filter as compared to cake filtration where generally high inclusion loads of larger-sized inclusions are removed at the surface of the filter.

In some embodiments, the plurality of pores may be interconnected. For example, the plurality of pores arranged between the inlet surface and the outlet surface may be respectively interconnected. Moreover, the interconnection of the pores may be chosen to provide effective depth filtration for a given liquid and contamination.

In some embodiments, the plurality of pores arranged between the inlet surface and the outlet surface may be arranged in order of a size of the pores. For example, the plurality of pores arranged between the inlet surface and the outlet surface may be arranged in order of a size of a diameter of the pore from the inlet (e.g., a front surface or an entrance) to the outlet (e.g., a back surface or an exit). Moreover, the order of the size of the pores may be chosen to provide an effective depth filtration for a given liquid and contamination.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
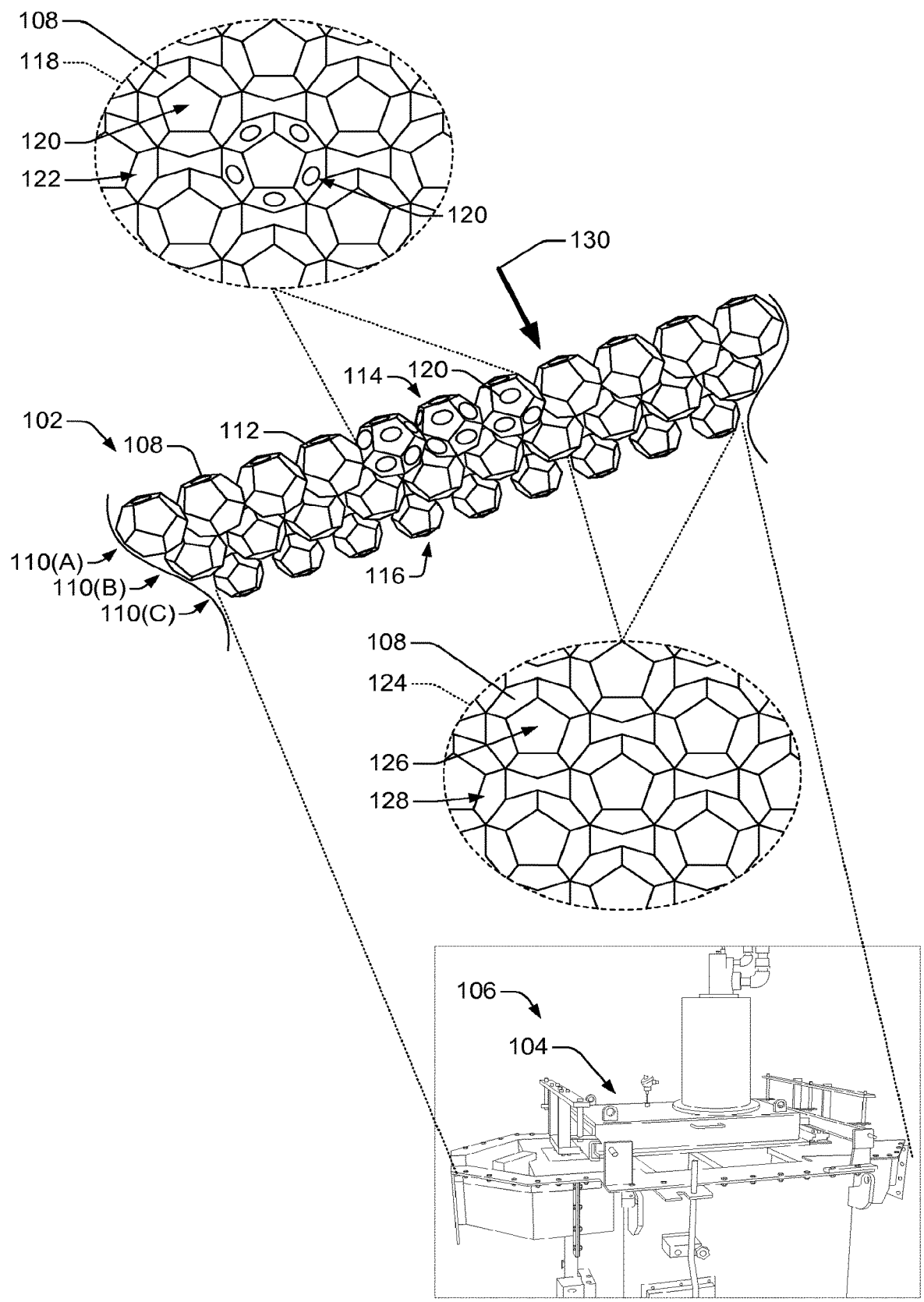
FIG. 1 is a side view diagram of an additively manufactured ceramic filter used, for example, to filter a given liquid (e.g., molten aluminium) in a filter box of a filtration system.

As noted above, even though existing ceramic foam filters (CFFs) formed from reticulated polyurethane foam exist, the CFFs do not provide enough precision in pore size and/or shape, creating problems in the production the CFFs and in the application of the CFFs. Further, because the existing CFFs are formed by ablating or burning away the underlying reticulated polyurethane foam, the CFFs are weak and/or brittle. Moreover, because the existing CFFs are formed by burning away the underlying reticulated polyurethane foam, the production of the CFFs are costly and detrimental to the environment. This application describes additively manufactured filters formed of ceramic having optimized pore sizes, shapes, orientations, and interconnections that, together, exhibit greater precision in pore size variation. Moreover, the additively manufactured filters described in this application exhibit higher effective filtration efficiency and higher strength than CFFs. This application also describes various techniques for additively manufacturing such ceramic filters at manufacturing facilities. By way of example and not limitation, this application describes the additively manufactured ceramic filters being used in the field of casting. For example, this application describes the additively manufactured ceramic filters being used in the field of casting semi-finished wrought aluminium products. However, the additively manufactured ceramic filters may be used in other fields. For example, the additively manufactured ceramic filters may be used in the field of water filtration, oil filtration, fuel filtration, or the like.

In general, additively manufactured ceramic filters as described in this application include a single unit of ceramic having an inlet surface and an outlet surface, and a plurality of pores arranged between the inlet surface and the outlet surface such that the plurality of pores change in size uniformly from the inlet surface to the outlet surface. The plurality of pores being continuous from the inlet surface to the outlet surface such that the plurality of pores are absent of layers and interfering surfaces. For example, the plurality of pores may be arranged between the inlet surface and the outlet surface such that the plurality of pores are absent of layers and interfering surfaces that produce irregularities that reduces depth filtration performance. The pores may be chosen to provide effective depth filtration for a given liquid and contamination. In one example, the pores may include a uniform geometry comprising a polyhedron shaped geometry. Depending on the specific application (e.g., desired permeability of the additively manufactured ceramic filter), the uniform geometry may be a dodecahedron, a cube, a sphere, a chevron, a cone, a pyramid, a curvilinear tube, etc. For example, the uniform geometry may be chosen to provide for producing hydrodynamic features (e.g., laminar flow, turbulent flow, vortexes, eddies, etc.) that impart improved depth filtration to a depth filtration cross-section of the additively manufactured ceramic filter. Depth filtration is described in a paper titled *Improving Performance In The Filtration Process*, published by Pyrotek™ at www.Pyrotek.info, which is incorporated by reference herein in its entirety.

The uniform geometry may be chosen to produce a boundary layer in laminar and/or turbulent flow that produces a vortex, eddy, and/or dead spot in the flow at a desired location (e.g., a capture site) in the uniform geometry. The vortex and/or desired location being chosen to produce effective filtration for a given liquid and contamination having a chosen velocity through the additively manufactured ceramic filter. For example, the pores may have a uniform geometry chosen to provide vortexes, eddies, and/or dead spots located proximate to a fluid entrance (e.g., window, opening, aperture, etc.) of the pore. That is, the uniform geometry may be chosen to have a structure (e.g., an obstacle, a wall, a barrier) having an angle and/or a radius relative to the fluid entrance that produces a desired eddy or vortex inside the pore, proximate to the fluid entrance. Because the pores produce desired vortexes, eddies and/or dead spots in a given liquid and contamination at desired locations, the pores capture more contamination, thereby increasing the depth filtration efficiency of the additively manufactured ceramic filter as compared to the pores of the CFFs formed from reticulated polyurethane foam. Moreover, because the pores have a chosen uniform geometry digitally modeled three-dimensionally and subsequently additively manufactured, the pores provide greater precision in pore size variation as compared to the precision in pore size variation of the CFFs formed from reticulated polyurethane foam. This is because the three-dimensionally (3D) modeled pores are 3D modeled exactly to the chosen features as compared to enforcing tight control, via measurement and specifications, of forming the reticulated polyurethane foam to be ablated. For example, the chosen uniform geometry may be digitally modeled three-dimensionally to exact specifications and subsequently additively manufactured with greater precision as compared to forming reticulated polyurethane foam under tight quality control to produce CFFs.

In an example where the uniform geometry is a dodecahedron, the pores may comprise hollow, substantially dodecahedral shaped units of ceramic that are chosen to be arranged in contiguous zones. The uniform geometry and/or the arrangement of the pores may be chosen to provide for producing a "tortuous path." For example, the uniform geometry of the pores and the pores may be chosen and arranged to force the fluid to change direction multiple of times. The pores may comprise struts and faces formed of ceramic. For example, the pores may comprise struts and faces having chosen sizes, shapes, and orientations that form the uniform geometry of the pores. The chosen struts and faces forming the uniform geometry are to produce the desired vortexes, eddies and/or dead spots in a given liquid and contamination having a chosen velocity through the uniform geometry.

As used herein, a substantially dodecahedral shaped unit includes a substantially dodecahedral shaped unit in three-dimensional space. For example, a series of hollow ceramic dodecahedrons may be arranged in contact with one another to form a zone of pores. In some examples, the dodecahedral shaped unit of ceramic may be additively manufactured to have a diameter of about 500 microns. In other examples, the dodecahedral shaped unit of ceramic may be additively manufactured to have a diameter of at least about 200 microns to at most about 5,000 microns. The diameter may vary depending on the specific application.

In some examples, the dodecahedral shaped unit of ceramic may be additively manufactured to have struts having a diameter of at least about 20 microns to at most about 50 microns. The strut diameter may vary depending on the specific application. In some examples, the dodecahedral shaped unit of ceramic may be additively manufactured to have faces having a thickness of at least about 10 microns to at most about 50 microns. The face thickness may vary depending on the specific application.

In some examples, the dodecahedral shaped unit of ceramic may be additively manufactured to have a fluid entrance of at least about 100 microns to at most about 2,000 microns. The fluid entrance may vary depending on the specific application. In some examples, the dodecahedral shaped unit of ceramic may be additively manufactured to have a fluid exit of at least about 100 microns to at most about 2,000 microns. The fluid exit may vary depending on the specific application. The fluid entrance and fluid exit may vary relative to each other depending on the specific application. Moreover, the dodecahedral shaped unit of ceramic may be additively manufactured to have a plurality of fluid entrances and exits. For example, each face of the dodecahedral shaped unit may have a fluid entrance or a fluid exit. Further, one or more additional dodecahedral shaped units may be additively manufactured to a central dodecahedral shaped unit. For example, each additional dodecahedral shaped unit may interface with a central dodecahedral shaped unit at each of the fluid entrances and/or fluid exits.

The substantially dodecahedral shaped unit may be additively manufactured to include dimples, pumps, and/or ridges etc., over a portion of the faces of the substantially shaped dodecahedral shaped unit. For example, the substantially dodecahedral shaped unit may be additively manufactured to include dimples, pumps, and/or ridges etc., over less than 20% of the surface of the faces.

In some embodiments, one or more zones of pores may be additively manufactured in an overlapping manner. For example, a top zone of pores may be arranged above a bottom zone of pores such that any interstitial space between contiguous pores is minimized. For instance, a pore arranged in the top zone may cover an interstitial space between two pores in the bottom zone arranged below the pore in the top zone. Further, the zones of pores may be arranged in order of diameter size. For example, the pores arranged in the top zone may have a diameter larger than a diameter of the pores arranged in the bottom zone. Moreover, the pores arranged in the top zone may be interconnected with the pores arranged in the bottom zone. For example, the pore arranged in the top zone may be interconnected with one and/or both of the two pores in the bottom zone arranged below the pore in the top zone.

Because the additively manufactured ceramic filters have greater precision in pore size variation, as compared to the pore size variation in CFFs, the additively manufactured ceramic filters have a higher quality and consistency than CFFs. Moreover, because the additively manufactured ceramic filters have greater precision in pore size variation, as compared to the pore size variation in CFFs, the additively manufactured ceramic filters have higher effective filtration efficiency than CFFs.

In addition, because the additively manufactured ceramic filters are additively manufactured to have solid structural components (e.g., struts and/or faces) forming the pores, this increases the strength of the additively manufactured ceramic filters, as compared to ablating or burning away underlying reticulated polyurethane foam leaving shelled components (e.g., hollow cores) in CFFs. Moreover, because the additively manufactured ceramic filters are additively manufactured, as compared to ablating or burning away underlying costly reticulated polyurethane, the production of the additively manufactured ceramic filters is less costly and less detrimental to the environment than the production of CFFs.

These and other aspects of the additively manufactured ceramic filters will be described in greater detail below with reference to several illustrative embodiments.

Example Additively Manufactured Ceramic Filters

This section describes an exemplary filter additively manufactured from a ceramic material.

In some implementations, the additively manufactured ceramic filters include a plurality of pores arranged between an inlet surface and an outlet surface in a single unit of ceramic such that the plurality of pores change in size from the inlet surface to the outlet surface. In some implementations, pores may be chosen to provide effective depth filtration for a given liquid and contamination. In some implementations, the pores may be additively manufactured to provide greater precision in pore size variation as compared to ceramic foam filters (CFFs). These and numerous other additively manufactured ceramic filters are described in this section.

FIG. 1 is a side view diagram of an additively manufactured ceramic filter 102 used, for example, to filter a given liquid (e.g., molten aluminium) in a filter box 104 of a filtration system 106. The filtration system 106 may provide for continuous or batch casting. The filtration system 106 may provide a pre-heat system to ensure the additively manufactured ceramic filter 102 is effectively and efficiently pre-heated across the entire surface of the additively manufactured ceramic filter 102. The filtration system 106 may be configured to house additively manufactured ceramic filters 102 having any shape. For example, the filtration system 106 may be configured in a range of sizes depending on the specific application. In one example, the filtration system 106 may have about a 228 millimeter filter box, and may be configured to house a single ceramic filter. In another example, the filtration system 106 may have about a 228 millimeter filter box, and may be configured to house two ceramic filters. Moreover, the filtration system 106 may have about a 584 millimeter filter box, and may be configured to house a single ceramic filter. Further, the filtration system 106 may have about a 584 millimeter filter box, and may be configured to house two ceramic filters. Further, the filtration system 106 may be configured to house additively manufactured ceramic filters 102 having a substantially rectangular shape, a substantially spherical shape, a substantially concave and/or convex shape, a substantially cylindrical shape, a substantially conical shape, and/or a substantially pyramidal shape, etc. For example, the filtration system 106 may be configured to house an additively manufactured ceramic filter 102 having a length of about 178 millimeters, a width of about 178 millimeters, and a height of about 50 millimeters. In another example, the filtration system 106 may be configured to house an additively manufactured ceramic filter 102 having a length of about 660 millimeters, a width of about 660 millimeters, and the height of about 50 millimeters.

As shown in FIG. 1, the additively manufactured ceramic filter 102 comprises a plurality of pores 108 (e.g., openings, voids, pockets, cavities, ports, passages, etc.). FIG. 1 shows a first pore 110(A), a second pore 110(B) below the first pore 110(A), and a third pore 110(C) below the second pore 110(B) arranged in a single unit of ceramic 112. The pores 108 arranged in the single unit of ceramic 112 being chosen to provide effective depth filtration for a given liquid and contamination. As shown in the side view, the single unit of ceramic 112 may have an inlet surface 114 and an outlet surface 116. In this embodiment, the inlet surface 114 is substantially parallel to the outlet surface 116. However, in other embodiments, the inlet surface and outlet surfaces 114, 116 need not be parallel and may be sloped or curved relative to one another.

In one example, top view diagram 118 illustrates each of the pores 108 may have a fluid entrance 120 having a pentagonal perimeter. However, in other examples, the fluid entrance 120 may have a perimeter having any type of shape. For example, the perimeter of the fluid entrance 120 may have any number of three or more sides, the perimeter of the fluid entrance 120 may have curvilinear sides, the perimeter of the fluid entrance 120 may be circular, etc. The fluid entrances 120 may be substantially planar and define a top surface 122 of the pores 108. The top surface 122 of the pores 108 may define the inlet surface 114 of the single unit of ceramic 112.

FIG. 1 illustrates each of the pores 108 may have fluid entrances 120 arranged in other faces of each of the pores 108. For example, the pores 108 may be dodecahedral shaped units having a fluid inlet and/or fluid outlet arranged in each face of the dodecahedral pores. Moreover, while not shown in FIG. 1, additional pores may be interface with each of the fluid entrances 120 arranged in other faces of the each of the pores 108. For example, each of the pores 108 may be a central pore and each additional pore may interface with the central pore at each of the fluid entrances 102 in the other faces.

Similarly, bottom view diagram 124 illustrates each of the pores 108 may have a fluid exit 126 having a pentagonal perimeter. However, in other examples, the fluid exit 126 may have a perimeter having any type of shape. For example, the perimeter of the fluid exit 126 may have any number of three or more sides, the perimeter of the fluid exit 126 may have curvilinear sides, the perimeter of the fluid exit 126 may be circular, etc. The fluid exits 126 may be substantially planar and define an outlet surface 128 of the pores 108. The outlet surface 128 of the pores 108 may define the outlet surface 116 of the single unit of ceramic 112.

Figure 2:
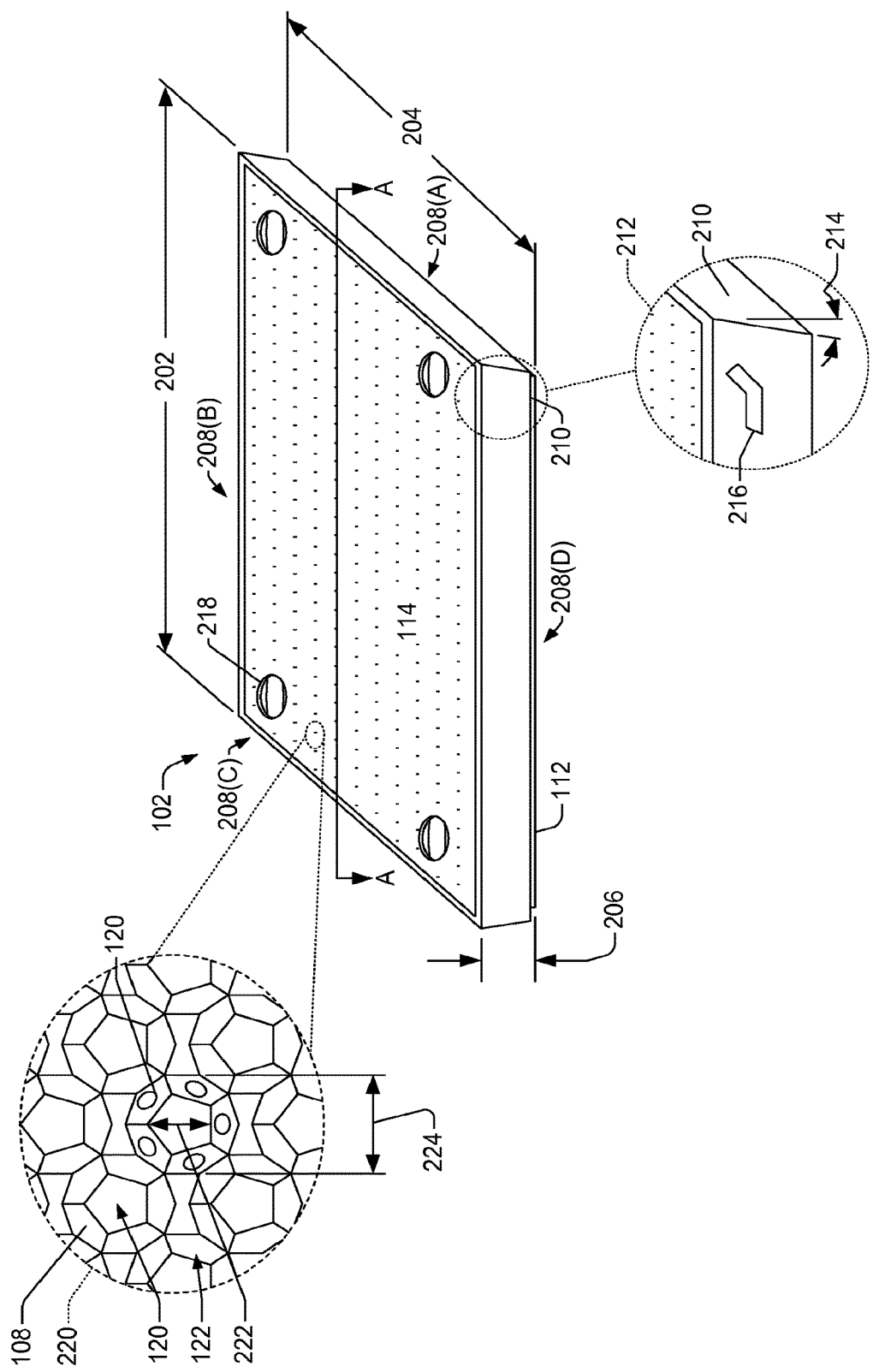
FIG. 2 illustrates a perspective front view of the additively manufactured ceramic filter of FIG. 1.

A given liquid (e.g., molten aluminium) may flow in a direction 130 into the inlet surface 114 and out the outlet surface 116. For example, a given fluid may flow in the direction 130 into the fluid entrances 120 of the pores 108, through the pores 108 arranged below, and out the fluid exits 126 of the pores 108. The given fluid may flow through the additively manufactured ceramic filter 102 in the direction 130 with a velocity of at least about 9 millimeters/second up to at most about 19 millimeters/second. The plurality of pores or openings may comprise at least about 60% to at least about 90% of a total volume of the additively manufactured ceramic unit. FIG. 2 illustrates a perspective front view of the additively manufactured ceramic filter 102 of FIG. 1. While FIG. 2 illustrates the additively manufactured filter having a substantially rectangular shape, the additively manufactured ceramic filter 102 may have any shape. For example, the additively manufactured ceramic filter 102 may have a substantially spherical shape, a substantially concave and/or convex shape, a substantially cylindrical shape, a substantially conical shape, or a substantially pyramidal shape, etc. Further, the additively manufactured ceramic filter 102 may have a range of sizes depending on the specific application. In one example, the additively manufactured ceramic filter 102 may have a length 202 of about 178 millimeters, a width 204 of about 178 millimeters, and a height 206 of about 50 millimeters. In another example, the length 202 may be about 660 millimeters, the width may be about 660 millimeters, and the height 206 may be about 50 millimeters. Moreover, because the additively manufactured ceramic filter 102 is additively manufactured, the height 206 of the additively manufactured ceramic filter 102 is not constrained or limited to a maximum height as compared to CFFs formed from ablated reticulated polyurethane foam. For example, the height 206 of the additively manufactured ceramic filter 102 may be greater than a maximum height of the CFFs of about 50 millimeters. In one example, the height 206 of the additively manufactured ceramic filter 102 may be about 76 millimeters. In another example, the height 206 of the additively manufactured ceramic filter 102 may be about 100 millimeters.

FIG. 2 illustrates the additively manufactured ceramic filter 102 may include one or more side surface(s) 208(A), 208(B), 208(C), and/or 208(D) of the single unit of ceramic 112. In one example, the side surfaces 208(A), 208(B), 208(C), and/or 208(D) may have a mechanical sealing feature 210 arranged to provide for seating the additively manufactured ceramic filter 102 in a filter box 104 of a filtration system. For example, the side surfaces 208(A), 208(B), 208(C), and/or 208(D) may have a gasket (e.g., fiber gasket, expandable gasket etc.) fixed to the side surfaces 208(A), 208(B), 208(C), and/or 208(D) to provide for seating the additively manufactured ceramic filter 102 in a filter box 104. Side view 212 illustrates the side surfaces 208(A), 208(B), 208(C), and/or 208(D) may be truncated and have an angle 214 to provide for seating the additively manufactured ceramic filter 102 in the filter box 104. For example, the angle 214 may provide for squeezing or deforming the gasket between the side surfaces 208(A), 208(B), 208(C), and/or 208(D) and the filter box 104.

While FIG. 2 illustrates the mechanical sealing feature 210 comprising a gasket type seal feature, the mechanical sealing feature 210 may comprise an O-ring type seal feature. For example, the single unit of ceramic 112 may include an O-ring groove to retain an O-ring to be squished or deformed against a surface of the filter box 104.

Moreover, because the additively manufactured ceramic filters 102 have a higher strength as compared to CFFs, the additively manufactured ceramic filters 102 may include fastening mechanism(s) to provide for removably fastening the additively manufactured ceramic filters 102 to the filter box 104. For example, the single unit of ceramic 112 may include a bayonet fastening mechanism 216 arranged along the side surfaces 208(A), 208(B), 208(C), and/or 208(D) configured to mate with a cooperating bayonet fastening mechanism (not shown) arranged along a surface of the filter box 104. However, although not shown in FIG. 2, other fastening mechanism may be used to removably fasten the additively manufactured ceramic filter 102 to a filter box 104. The bayonet fastening mechanism 216 may be formed integral with the single unit of ceramic 112. For example, the bayonet fastening mechanism 216 may be ceramic features formed integral with the single unit of ceramic 112.

The additively manufactured ceramic filter 102 may include a removal mechanism 218 to provide for removing a spent additively manufactured ceramic filter 102 from a filter box 104. For example, the removal mechanism 218 may be a mechanism (e.g., truss(es), eye(s), hook(s), loop(s), indent(s), protrusion(s), ring(s)) formed integral with the single unit of ceramic 112 to provide for a tool (e.g., tongs, pliers, skewers, etc.) to extract the additively manufactured ceramic filter 102 from a filter box 104. Stated otherwise, the removal mechanism 218 may be ceramic features (e.g., hook(s), indent(s), protrusion(s), ring(s)) additively manufactured into the single unit of ceramic 112 to provide for a tool to extract the additively manufactured ceramic filter 102 from a filter box 104. Moreover, the additively manufactured ceramic filter 102 may include reinforcement structures arranged with the removal mechanism 218 to strengthen the single unit of ceramic 112 to prevent the additively manufactured ceramic filter 102 from breaking or crumbling apart during removal and/or installation.

In one example, the removal mechanism 218 may comprise a truss structure formed integral with the single unit of ceramic 112 to provide for a tool to hook to and extract the additively manufactured filter 102 from a filter box 104. In another example, the removal mechanism 218 may comprise one or more indent(s) configured to receive one or more pins of a wrench (e.g., a two pin wrench) to provide for the wrench to loosen and/or tighten the additively manufactured ceramic filter 102 out of and/or into a filter box 104. For example, the additively manufactured filter 102 may be substantially disc shaped, having the bayonet fastening mechanism 216 arranged along the side of the additively manufactured filter 102, and the one or more indent(s) may provide for the pin wrench to torque the additively manufactured ceramic filter 102 to loosen and/or tighten the additively manufactured ceramic filter 102 out of and/or into a filter box 104.

Detail view 220 illustrates each fluid entrance 120 of the pores 108 may have a diameter 222 of at least about 100 microns to at most about 2,000 microns depending on the application. Similarly, each fluid exit 126 of the pores 108 may have the diameter 222 of at least about 100 microns to at most about 2,000 microns depending on the application. Detail view 220 also illustrates each pore 108 may have an external diameter 224 of at least about 500 microns to at most 5100 microns depending on the application. For example, an additively manufactured ceramic filter 102 may be configured for an application requiring an 80 grade filter to capture inclusions from liquid aluminium. Pore size (i.e., pore diameter) is related to the filter grade and is described in a paper titled *Recent Improvements In The Measurement And Control of Ceramic Foam Filter Quality*, published by Pyrotek™ at www.Pyrotek.info, which is incorporated by reference herein in its entirety.

An additively manufactured ceramic filter 102 having an 80 filter grade may have pores 108, each having an external diameter 224 of at least about 600 microns. Moreover, because the pores 108 are additively manufactured, the external diameter 224 of each uniform pore 108 is controlled with much greater precision as compared to controlling a precision of diameters of pores of CFFs. This is because the external diameter 224 may be digitally modeled exactly to a chosen external diameter 224 and subsequently additively manufactured with greater precision as compared to forming reticulated polyurethane foam, under tight quality control, having a range of external diameters (e.g., allowable minimum and maximum external diameters). For example, for an application requiring an 80 grade filter type, the average external diameter 224 of each pore 108 of the additively manufactured ceramic filter 102 may have a minimum external diameter 224 of about 640 microns and a maximum external diameter 224 of about 660 microns as compared to a minimum external diameter of about 600 microns and a maximum external diameter of about 700 microns from a CFF.

FIG. 2 also illustrates a section line A-A. The section line A-A is taken approximate to a center of the additively manufactured ceramic filter 102.

Figure 3:
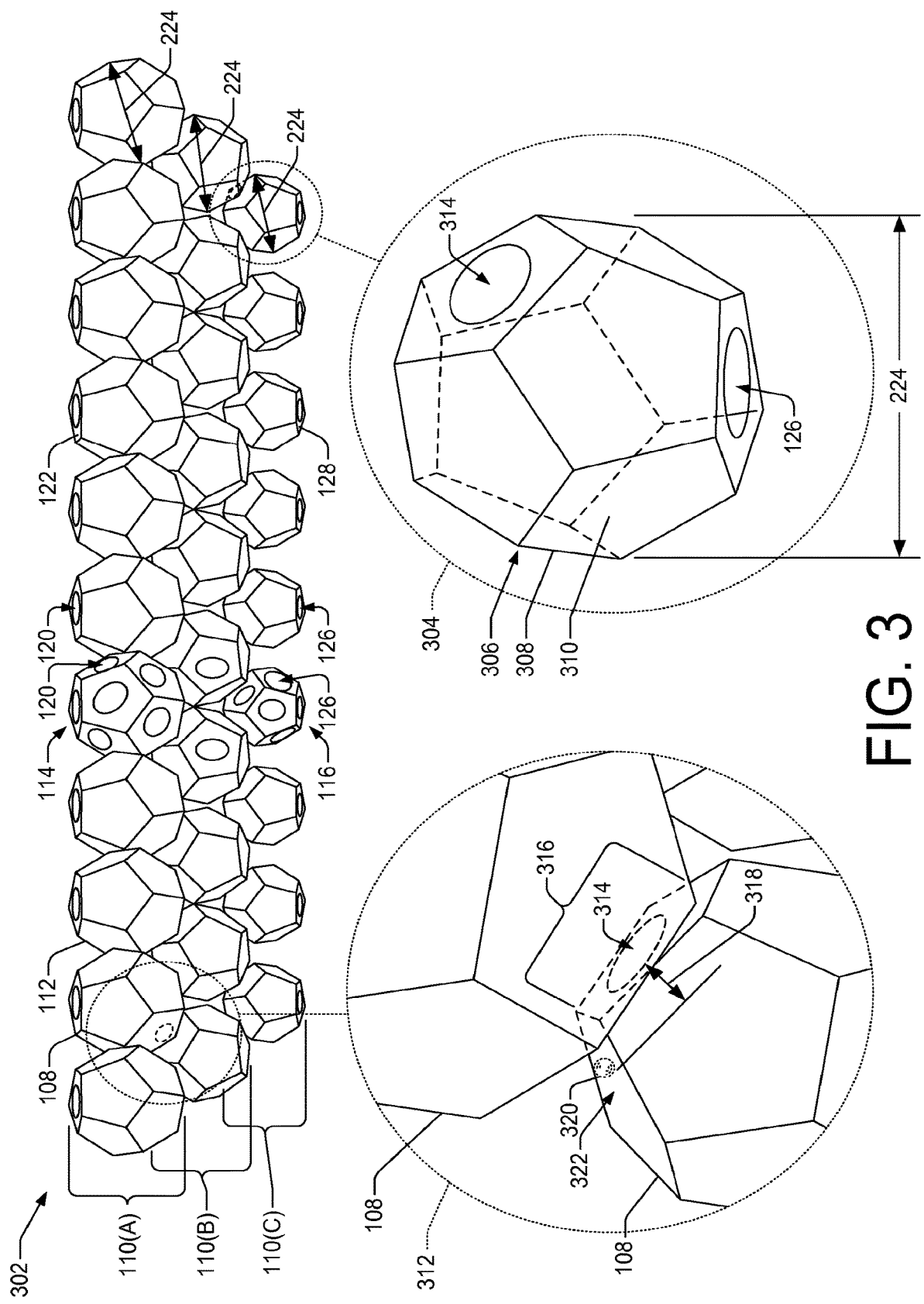
FIG. 3 illustrates a detail section view of the illustrative additively manufactured ceramic filter illustrated in FIG. 1 taken along the section line A-A.

FIG. 3 illustrates a detail section view 302 of the illustrative additively manufactured ceramic filter 102 illustrated in FIG. 1 taken along the section line A-A. FIG. 3 illustrates the pores 108 in the single unit of ceramic 112 being continuous from the inlet surface 114 to the outlet surface 116 such that the plurality of pores change in size uniformly from the inlet surface to the outlet surface. Moreover, FIG. 3 illustrates that pores 108 may be arranged zones that are absent of interfering surfaces. Because the pores 108 are additively manufactured, the pores are continuous from the inlet surface 114 to the outlet surface 116. The pores 108 are continuous because the pores 108 are additively manufactured such that the pores 108 are formed integral with each other. Stated otherwise, the zones are continuous because the pores are additively manufactured such that the zones are absent of discrete surfaces between one another. Because the pores 108 in the single unit of ceramic 112 are continuous from the inlet surface 114 to the outlet surface 116 such that the zones are absent of interfering surfaces, the additively manufactured ceramic filter 102 has an increased depth filtration performance as compared to CFFs. This is, because the zones are absent of interfering surfaces as compared to multiple layered CFFs having interfering surfaces between each layer.

FIG. 3 illustrates the pores 108 may be arranged in order of a size of the external diameter 224 of the plurality of pores 108. Further, the pores 108 may be arranged in order of the size of the external diameter 224 of the plurality of pores 108 from the inlet surface 114 to the outlet surface 116. For example, the pores 108 may be arranged from the largest external diameter 224 of the plurality of pores 108 proximate to the inlet surface, to the smallest external diameter 224 of the plurality of pores 108 proximate to the outlet surface 116. Thus, because the pores 108 are arranged from the largest external diameter 224 of the plurality of pores 108 proximate to the inlet surface, to the smallest external diameter 224 of the plurality of pores 108 proximate to the outlet surface 116, and because the pores 108 are continuous, the pores 108 are continuously variable from the inlet surface 114 to the outlet surface 116. Because the pores 108 are continuously variable from the inlet surface 114 to the outlet surface 116 the additively manufactured ceramic filters 102 provide more effective depth filtration than CFFs.

While FIG. 3 illustrates the pores 108 may be arranged from largest external diameter 224 of the plurality of pores 108 proximate to the inlet surface 114, to smallest external diameter 224 of the plurality of pores 108 proximate to the outlet surface 116, the pores 108 may be arranged in any order of size to provide hydrodynamic features (e.g., laminar flow, turbulent flow, vortexes, eddies, etc.) that provide effective depth filtration for a given liquid and contamination. For example, the pores 108 may be arranged from the largest external diameter 224 of the plurality of pores 108 in a zone proximate to the inlet surface 114, to the smallest external diameter 224 of the plurality of pores 108 in a zone proximate to a middle of the single unit of ceramic 112, and to the largest external diameter 224 of the plurality of pores 108 in zone proximate to the outlet surface 116. Moreover, the pores 108 may be arranged in random order according to the size of the external diameter 224 of the plurality of pores 108 from the inlet surface 114 to the outlet surface 116.

While FIG. 3 illustrates the top surfaces 122 of the plurality pores 108 being substantially coplanar, the top surfaces 122 may have any angle relative to each other. For example, each of the top surfaces 122 of the plurality pores 108 may have any obtuse angle relative to the inlet surface 114. Moreover, each of the top surfaces 122 of the plurality pores 108 may be rotated any degree relative to the center axis of each of the pores 108. For example, each of the pores 108 may be rotated a degree relative to the center axis of each of the pores 108.

Similarly, while FIG. 3 illustrates the outlet surfaces 128 of the plurality pores 108 being substantially coplanar, the outlet surfaces 128 of the plurality pores 108 may have any angle relative to each other. For example, each of the outlet surfaces 128 of the plurality pores 108 may have any obtuse angle relative to the outlet surface 116 of the single unit of ceramic 112. Moreover, each of the outlet surfaces 128 of the plurality pores 108 may be rotated any degree relative to the center axis of each of the pores 108.

As shown in detail view 304, the pores 108 in each of the may have substantially the same uniform geometry 306. While detail view 304 illustrates the pores 108 have a substantially dodecahedron shaped geometry, the plurality of pores 108 may have any shaped geometry. For example, the plurality of pores 108 may have any polyhedron shaped geometry, a spherical shaped geometry, a tubular shaped geometry, worm shape geometry, a chevron shaped geometry (e.g., a V-shaped geometry), etc. Moreover, the dodecahedron shaped geometry may be oblong. For example, the dodecahedron shaped pore may have a length greater than its width.

Detail view 304 also shows each pore 108 comprise struts 308 and faces 310. The internal surface of the pore 108 may substantially spherical. The struts 308 may be substantially bar shaped structural members of the pore 108. The bar shaped struts 308 may have any cross-sectional shape. For example, the struts 308 may have a substantially rectangular bar shaped cross-section, substantially triangular bar shaped cross-section, substantially circular bar shaped cross-section, and/or substantially ovular bar shaped cross-section, etc. The struts 308 may have a cross-sectional diameter of at least 20 microns to at most about 50 microns. The size and shape of the struts 308 may be chosen and digitally modeled three-dimensionally to exact specifications. For example, the geometric shape (e.g., shape and/or size) of the struts 308 may be chosen and digitally modeled to produce desired eddies and/or vortexes in a given liquid and contamination. The digitally modeled geometric shape of the struts 308 may be additively manufactured with precision in size and shape as compared to CFFs.

The faces 310 may be structural members of the pore 108 and may be any shaped surface having a thickness of at least about 10 microns to at most about 50 microns. For example, each face 310 may have a substantially planar polygonal (e.g., pentagonal) shaped surface having a thickness of at least about 10 microns to at most about 50 microns. The faces 310 may be chosen and digitally modeled three-dimensionally to exact specifications. For example, the geometric shape (e.g., shape and/or size) of the faces 310 may be chosen and digitally modeled to produce desired eddies and/or vortexes in a given liquid and contamination. The digitally modeled geometric shape of the faces 310 may be additively manufactured with precision in size and shape as compared to CFFs.

As shown in the detail view 304, the fluid entrance 120 and/or the fluid exit 126 may be arranged in one or more of the faces 310 of the pores 108. For example, any number of the fluid entrances 120 and/or the fluid exits 126 may be arranged in the faces 310 to produce desired eddies, vortexes, and/or fluid velocities in a given liquid and contamination. The chosen number of fluid entrances 120 and/or fluid exits 126 may be digitally modeled three-dimensionally to exact specifications. Moreover, the size and shape of the fluid entrances 120 and/or the fluid exits 126 may be chosen and digitally modeled three-dimensionally to exact specifications. For example, the fluid entrance 120 and/or the fluid exit 126 may be digitally modeled three-dimensionally to have a substantially pentagonal shaped perimeter to produce desired eddies and/or vortexes in a given liquid and contamination. In another example, the fluid entrance 120 and/or the fluid exit 126 may be digitally modeled three-dimensionally to have a substantially circular shaped perimeter to produce desired eddies and/or vortexes in a given liquid and contamination. The digitally modeled geometric shape of the fluid entrance 120 and/or the fluid exit 126 may be additively manufactured with precision in size and shape as compared to CFFs.

While the surfaces of the faces 310 are illustrated as having uniform or smooth surfaces, the surfaces of the faces 310 may be non-uniform. For example, the faces 310 may have one or more protruding or indenting features, such as ribs, ridges, grooves, channels, fins, quills, pyramids, mesh, nubs, dimples, or the like. The features may protrude or indent perpendicular to the respective faces 310 or at an oblique angle relative to the respective faces 310. The non-uniform surface of the faces 310 may provide for enhancing each pore 108 to produce desired eddies and/or vortexes in a given liquid and contamination. Moreover, the non-uniform surface of the faces 310 may provide for enhancing capture sites of each pore 108.

FIG. 3 illustrates the plurality of pores 108 may be respectively interconnected. As shown in detail view 312, the pore 108 arranged in a zone having the first pores 110(A) is interconnected with the pore 108 arranged in a zone having the second pores 110(B). The pores 108 may be interconnected via an aperture 314 arranged in a combined portion 316 of the pores 108. The apertures 314 arranged in the combined portion 316 of the pores 108 may provide for a given liquid and contamination to pass from the pore 108 arranged in the zone having the first pores 110(A) to the pore 108 arranged in the zone having the second pores 110(B).

The pore 108 arranged in the zone having the first pores 110(A) may be additively manufactured as a single unit of ceramic with the pore 108 arranged in the zone having the second pores 110(B) such that the combined portion 316 is absent of interfering surfaces. Moreover, a size, shape, and/or location of the aperture 314 and/or combined portion 316 may be chosen to provide effective depth filtration for a given liquid and contamination. For example, the size, shape, and/or location of the aperture 314 and/or combined portion 316 may be chosen to provide hydrodynamic features (e.g., laminar flow, turbulent flow, vortexes, eddies, etc.) that provide effective depth filtration for a given liquid and contamination. While detail view 312 shows the aperture 314 having a substantially planar surface, the shape of the aperture 314 may be chosen to provide a nozzle feature that produces one or more eddies past the aperture 314. In one example, the shape of the apertures 314 and/or combined portion 316 may be chosen to provide a convergent nozzle feature. In another example, the shape of the apertures 314 and/or combined portion 316 may be chosen to provide a divergent nozzle feature.

The size, shape, and/or location of the aperture 314 and/or combined portion 316 may be chosen to produce an eddy a distance 318 past the aperture 314. For example, the given liquid may transport contamination past the aperture 314 and form a space 320 in the given fluid proximate to a capture site 322 on the pore 108. The space 320 in the given fluid and contamination having less velocity than a velocity of the given fluid and contamination flowing past the aperture 314. Because the given fluid and contamination have less velocity in the space 320 at the distance 318 past the aperture 314, the contamination attaches to the pore 108 at the capture site 322 and remains in the pore 108. Thus, the chosen size, shape, and/or location of the aperture 314 and/or combined portion 316 provide effective depth filtration of the contamination from the given liquid.

In addition to choosing sizes, shapes, and/or locations of the apertures 314 and/or combined portions 316 of the pores 108, a velocity of a given liquid and contamination is also chosen to provide effective depth filtration for the given liquid and contamination. In one example, the chosen velocity of the given liquid should be about 10 millimeters/second through the additively manufactured ceramic filter 102 to produce the eddy at the distance 318 past the aperture 314. In another example, the chosen velocity of the given liquid should be at least about 9 millimeters/second up to at most about 19 millimeters/second through the additively manufactured ceramic filter 102 to produce the eddy at the location 320 past the aperture 314. In another example, in addition to choosing sizes, shapes, and/or locations of the apertures 314 and/or combined portions 316 of the pores 108, a porosity of the additively manufactured ceramic filer may be chosen. For example, the porosity may be chosen to be at least about 60% to at least about 90% porosity. For example, the plurality of pores or openings may comprise at least about 60% to at least about 90% of a total volume of the additively manufactured ceramic unit.

Figure 4:
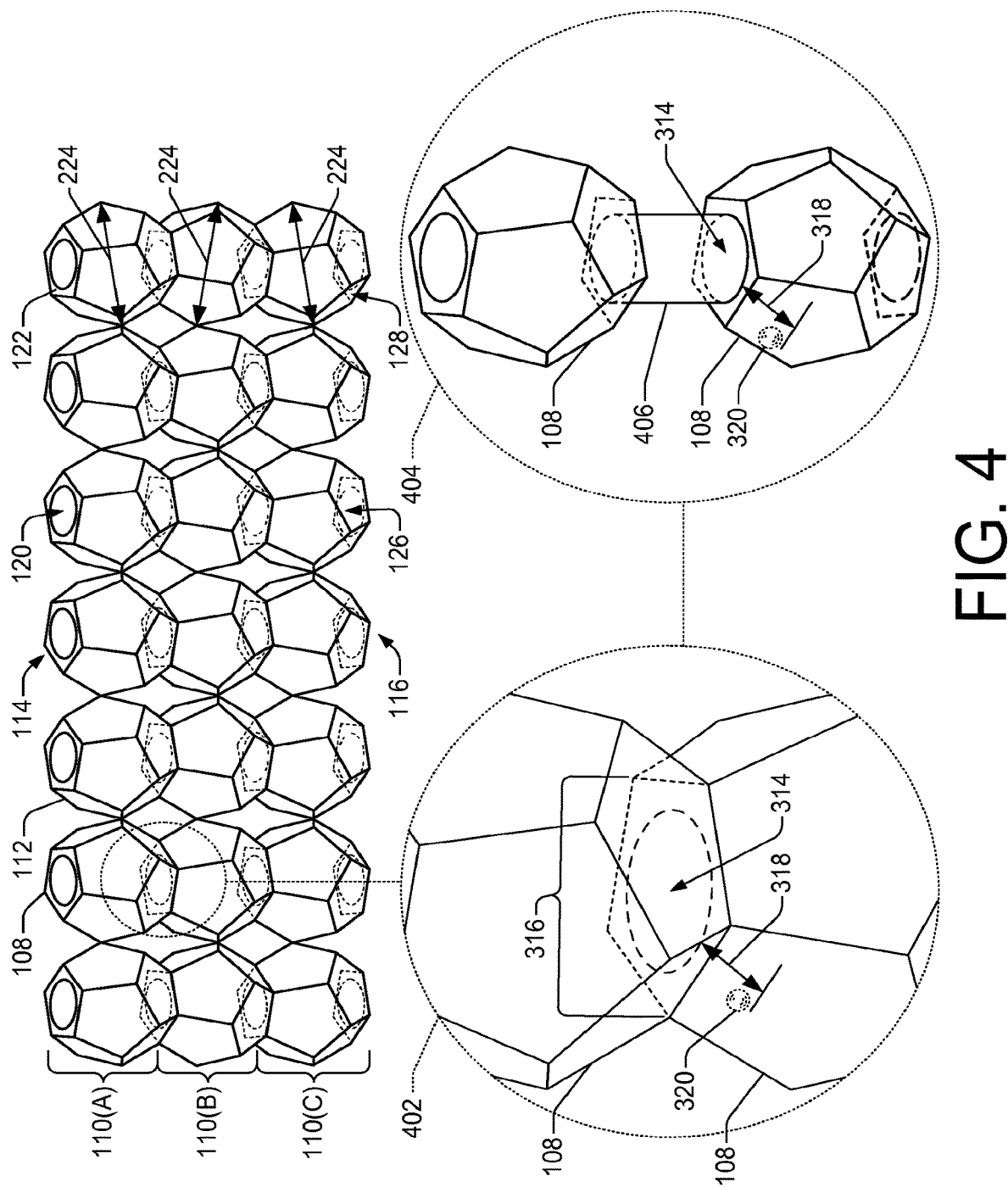
FIG. 4 illustrates an embodiment of the arrangement of the plurality of pores.

FIG. 4 illustrates another embodiment of the arrangement of the plurality of pores 108. FIG. 4 illustrates the pores 108 in the single unit of ceramic 112 being continuous from the inlet surface 114 to the outlet surface 116 such that pores 108 have substantially the same geometry. FIG. 4 illustrates the plurality of pores 108 may be arranged in-line. For example, a pore 108 of the plurality of pores 108 in the zone having the first pores 110(A) is arranged directly above, and is centered with, a pore 108 of the plurality of pores 108 in the zone having the second pores 110(B). Further, a geometric center of the pores 108 of the plurality of pores 108 in the zone having the first pores 110(A) may be arranged directly above, and centered with, a geometric center of a pore 108 of the plurality of pores 108 in the zone having the second pores 110(B).

FIG. 4 illustrates the plurality of pores 108 may have a substantially same sized external diameter 224. While FIG. 4 illustrates the plurality of pores 108 having the same sized external diameters 224, the plurality of pores 108 may have any sized external diameters 224.

As shown in detail view 402, the pores 108 are interconnected. The pores 108 may be interconnected via the aperture 314 arranged in the combined portion 316 of the pores 108. As discussed above with regard to FIG. 3, the size, shape, and/or location of the aperture 314 and/or combined portion 316 may be chosen to produce the eddy the distance 318 past the aperture 314.

While detail view 402 shows the pores 108 interconnected via an aperture 314 arranged in a combined portion 316 of the pores 108, other interconnections are contemplated. For example, detail view 404 shows, the pores 108 may be interconnected via a tube 406.

The tube 406 may be formed integral with the pores 108, and have any size and/or shape. For example, the tubes 406 may have a substantially pentagonal shaped cross-section, substantially rectangular shaped cross-section, substantially triangular shaped cross-section, substantially circular shaped cross-section, and/or substantially ovular shaped cross-section, etc. The tubes 406 may have an internal cross-sectional diameter substantially the same as the diameter of the fluid entrances 120 and/or the fluid exits 126. For example, the tubes 406 may have an internal cross-sectional diameter of at least about 100 microns to at most about 2,000 microns depending on the application. Moreover, the tubes 406 may have a substantially rectilinear shape from one pore 108 to another pore 108, and/or the tubes 406 may have a substantially curvilinear shape (e.g., loops, chevrons (e.g., V-shapes), helixes, etc.) from one pore 108 to another pore 108.

The size and shape of the tubes 406 may be chosen and digitally modeled three-dimensionally to exact specifications. For example, the geometric shape (e.g., shape and/or size) of the tubes 406 may be chosen and digitally modeled to produce desired eddies and/or vortexes in a given liquid and contamination. The digitally modeled geometric shape of the tubes 406 may be additively manufactured with precision in size and shape.

Figure 5:
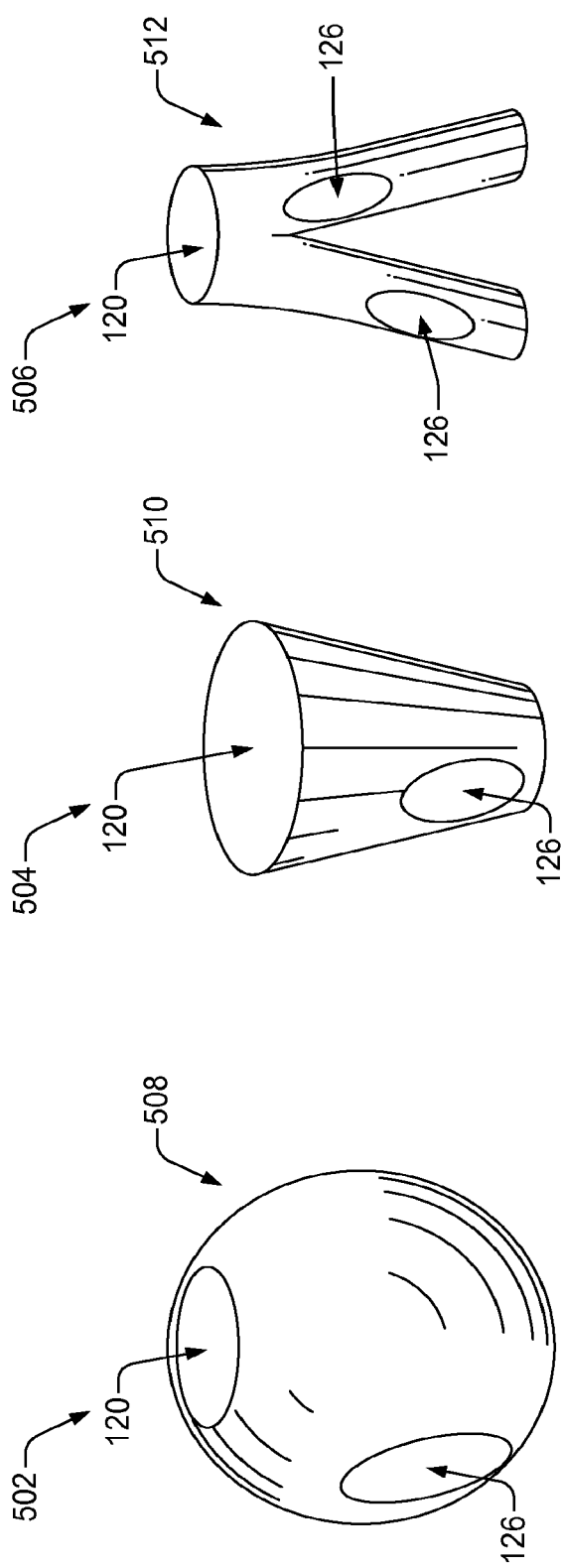
FIG. 5 illustrates embodiments of pores that may be chosen and digitally modeled to produce desired eddies and/or vortexes in a given liquid and contamination.

FIG. 5 illustrates embodiments 502, 504, and 506 of pores 108 that may be chosen and digitally modeled to produce desired eddies and/or vortexes in a given liquid and contamination. Each embodiment 502-506 illustrating a different uniform geometry 306 of a pore 108. The embodiment 502 illustrates a uniform geometry 306 as a sphere 508 having the fluid entrance 120 and the fluid exit 126. The embodiment 504 illustrates a uniform geometry 306 as a cone 510 having the fluid entrance 120 and the fluid exit 126. The embodiment 506 illustrates a uniform geometry 306 as an inverted chevron 512 having the fluid entrance 120 and the fluid exits 126.

Depending on the specific application, one or more of the pore embodiments 502-506 may be chosen and digitally modeled to produce desired eddies and/or vortexes in a given liquid and contamination. For example, the inverted chevron 512 may be arranged between an inlet surface and an outlet surface such that the plurality of chevrons 512 change in size uniformly from the inlet surface to the outlet surface to provide effective depth filtration for a given liquid and contamination.

Example Methods of Additively Manufacturing Ceramic Filters

Figure 6:
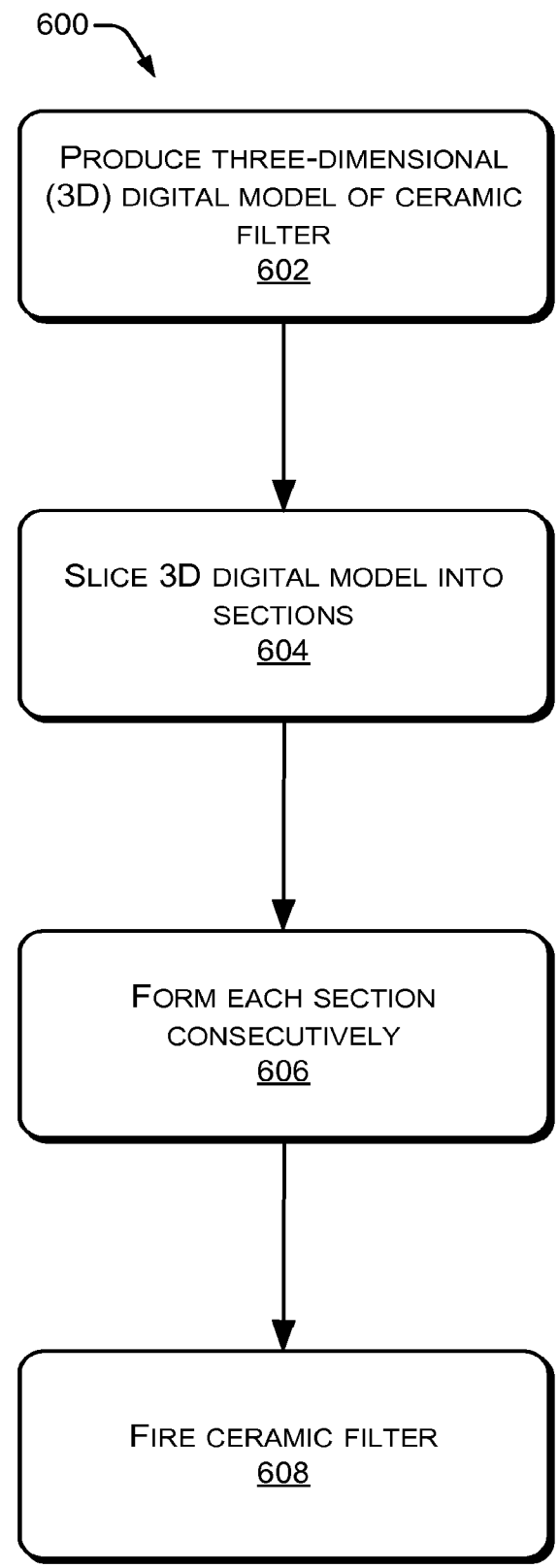
FIG. 6 is a flow diagram illustrating an example process of manufacturing the illustrative additively manufactured ceramic filter illustrated in FIG. 1.
Figure 7:
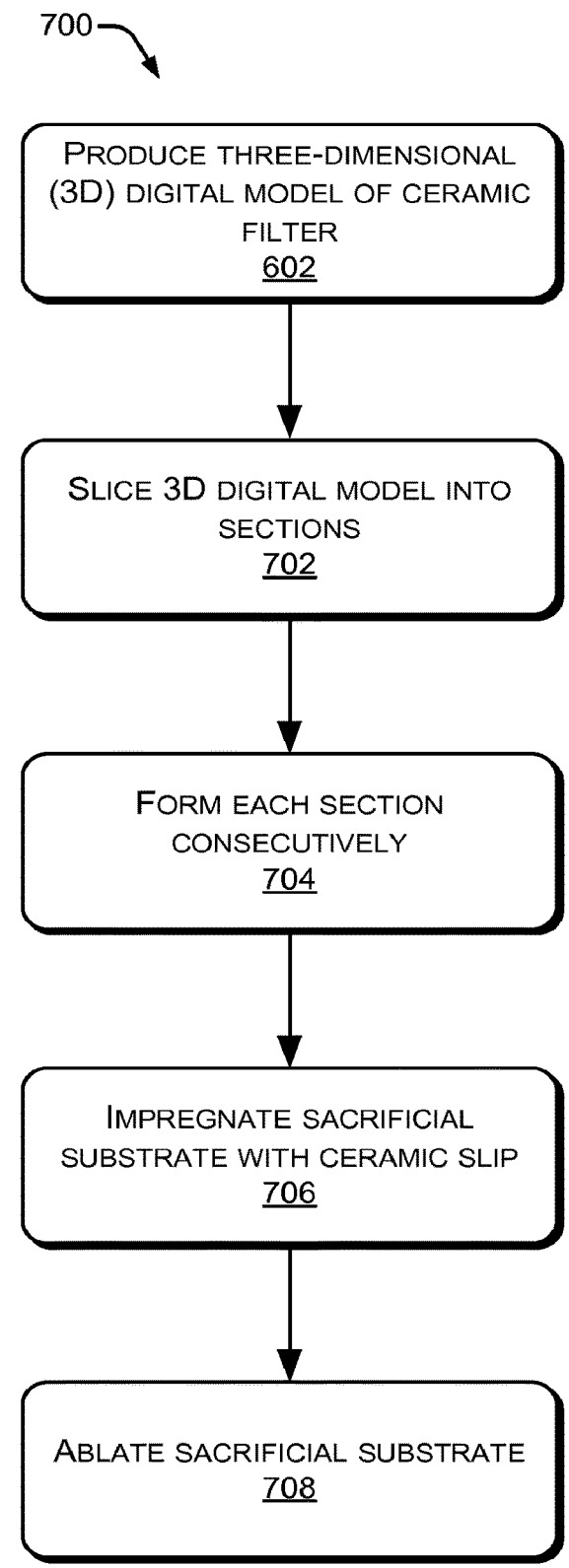
FIG. 7 is a flow diagram illustrating an example process of manufacturing the illustrative additively manufactured ceramic filter illustrated in FIG. 1.
Figure 8:
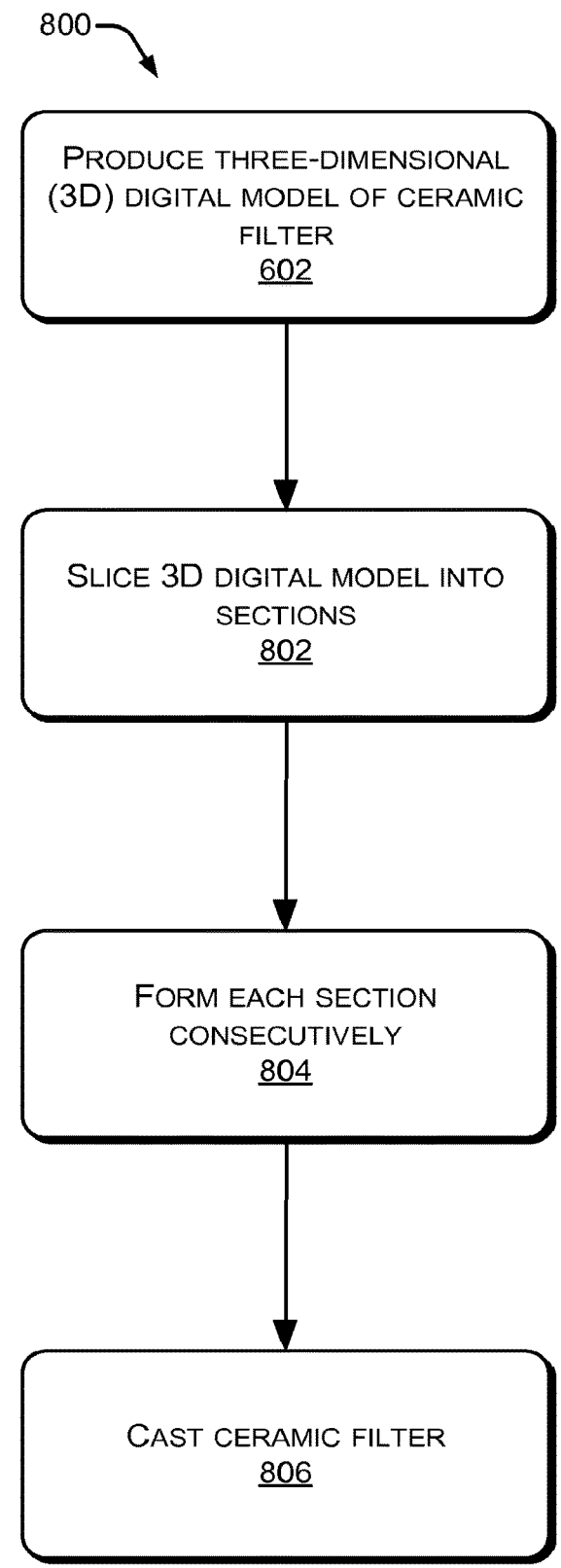
FIG. 8 is a flow diagram illustrating an example process of manufacturing the illustrative additively manufactured ceramic filter illustrated in FIG. 1.

FIG. 6, FIG. 7, and FIG. 8 illustrate example processes 600, 700, and 800 of forming a ceramic filter (e.g., additively manufactured ceramic filter 102) at a manufacturing facility using an additive manufacturing process. While these processes describe forming a ceramic filer, other items are contemplated. For example, these processes may be used to form items in applications of medicine, electronics, biomaterials, etc. For example, these processes may be used to form medical devices or components (e.g., heart valves, joints, limbs, or the like), or electronic devices or components (e.g., printed circuit boards, printed circuit assemblies, transistors, etc.).

In the example processes 600, 700, and/or 800 the additive manufacturing processes may comprise an extrusion additive manufacturing process, granular additive manufacturing process, laminated additive manufacturing process, or light polymerized additive manufacturing process, etc.

Moreover, the additive manufacturing process may comprise a fused deposition modeling (FDM) technology, a direct metal laser sintering (DMLS) technology, electron beam melting (EBM) technology, selective heat sintering (SHS) technology, selective laser sintering (SLS) technology, powder-based three-dimensional printing (PP) technology, laminated object manufacturing (LOM) technology, stereolithography (SLA) technology, or digital light processing (DLP) technology, etc.

Process 600 may include laser sintering of ceramic powders (e.g., alumina-based ceramic powder) which would then be fired. Process 700 may include laser printing of polymer substrates which would then be coated with a ceramic slip (e.g., phosphate-bonded alumina-based material) which would then be fired. Process 800 may include additively manufacturing a mold (e.g., a master shape) which would then be used to cast replica ceramic filters.

In example processes 600, 700, and 800 the 3D ceramic filter comprises a plurality of pores (e.g., pores 108), each pore of the plurality of pores having a geometry (e.g., uniform geometry 306) configured to filter particulates from a liquid. Further, in example process 600, the plurality of pores are arranged between an inlet surface (e.g., inlet surface 114) of the 3D ceramic filter and an outlet surface (e.g., outlet surface 116) of the 3D ceramic filter. The pores being arranged between the inlet surface and the outlet surface such that the plurality of pores change in size uniformly from the inlet surface to the outlet surface.

Moreover, in example processes 600, 700, and 800 each of the plurality of pores are respectively interconnected. By way of example and not limitation, these processes may be performed at a manufacturing facility, a plant, a foundry, a factory, or the like.

FIG. 6 illustrates example process 600 includes operation 602, which represents producing a three-dimensional (3D) digital model of the ceramic filter. For example, a uniform geometry (e.g., uniform geometry 306) may be chosen based on a given liquid and contamination and subsequently digitally modeled. In one example, the size and shape of struts (e.g., struts 308), faces (e.g., faces 310), fluid entrances (e.g., fluid entrances 120), fluid exits (e.g., fluid exits 126), and/or apertures (e.g., apertures 314) may be chosen based on the given liquid and contamination and digitally modeled.

Process 600 includes operation 604, which represents slicing the 3D digital model of the ceramic filter into a plurality of sections. For example, the additive manufacturing process may generate digital slices of the 3D digital model of the ceramic filter into consecutive digital sections or layers. Each digital layer having a thickness of at least about 10 microns to at most about 50 microns to provide for the additive manufacturing process to additively form the ceramic filter from a ceramic (e.g., alumina-based ceramic powder). For example, a first digital layer having the thickness of at least about 10 microns to at most about 50 microns may comprise the faces forming outlet surfaces (e.g., outlet surfaces 128) of the pores arranged in a bottom uniform array (e.g., uniform array 110(C)). Each additional consecutive digital layer having the thickness of at least about 10 microns to at most about 50 microns and comprising additional consecutive features of the 3D digital model of the ceramic filter.

Operation 604 may be followed by operation 606, which represents forming each section of the plurality of sections of the 3D digital model of the ceramic filter consecutively on top of a previous section. The forming may comprise forming each section of the plurality of sections of the 3D digital model of the ceramic filter with a ceramic material to additively manufacture the ceramic filter. For example, the first digital layer comprising the faces forming the outlet surfaces of the pores arranged in the bottom zone may be formed. For example, the first digital layer may be laser sintered of ceramic powders. Each additional consecutive digital layer may be consecutively laser sintered of ceramic powders on top of a previous laser sintered layer to form a 'green' ceramic filter.

Process 600 may be completed at operation 608, which represents firing the 'green' ceramic filter.

FIG. 7 illustrates example process 700 includes operation 602, which represents producing a three-dimensional (3D) digital model of the ceramic filter. Process 700 includes operation 702, which represents slicing the 3D digital model of the ceramic filter into a plurality of sections. For example, the additive manufacturing process may generate digital slices of the 3D digital model of the ceramic filter into consecutive digital sections or layers. Each digital layer having a thickness of at least about 10 microns to at most about 50 microns to provide for the additive manufacturing process to additively form a sacrificial substrate from a consumable material (e.g., a polymer). For example, a first digital layer having the thickness of at least about 10 microns to at most about 50 microns may comprise the faces forming outlet surfaces (e.g., outlet surfaces 128) of the pores arranged in a bottom uniform array (e.g., uniform array 110(C)). Each additional consecutive digital layer having the thickness of at least about 10 microns to at most about 50 microns and comprising additional consecutive features of the 3D digital model of the ceramic filter.

Operation 702 may be followed by operation 704, which represents forming each section of the plurality of sections of the 3D digital model of the ceramic filter consecutively on top of a previous section. The forming may comprise forming each section of the plurality of sections of the 3D digital model of the ceramic filter with the polymer to additively manufacture the sacrificial substrate to subsequently produce the ceramic filter. For example, the first digital layer comprising the faces forming the outlet surfaces of the pores arranged in the bottom uniform array may be formed. For example, the first digital layer may be laser printed of a polymer. Each additional consecutive digital layer may be consecutively laser printed of the polymer on top of a previous laser printed layer to form a sacrificial substrate of the ceramic filter.

Process 700 may include operation 706, which represents impregnating the sacrificial substrate with a ceramic slip. For example, the sacrificial substrate may be impregnated with a ceramic slip comprising a phosphate-bonded alumina-based material. The excess ceramic slip may be removed, and the impregnated substrate may be dried.

Process 700 may be completed at operation 708, which represents ablating or burning away the sacrificial substrate to produce the ceramic filter.

FIG. 8 illustrates example process 800 includes operation 602, which represents producing a three-dimensional (3D) digital model of the ceramic filter. Process 800 includes operation 802, which represents slicing the 3D digital model of the ceramic filter into a plurality of sections. For example, the additive manufacturing process may generate digital slices of the 3D digital model of the ceramic filter into consecutive digital sections or layers. Each digital layer having a thickness of at least about 10 microns to at most about 50 microns to provide for the additive manufacturing process to additively form a mold from a base material (e.g., a plaster). For example, a first digital layer having the thickness of at least about 10 microns to at most about 50 microns may comprise images of the faces forming outlet surfaces (e.g., outlet surfaces 128) of the pores arranged in a bottom uniform array (e.g., uniform array 110(C)). Each additional consecutive digital layer having the thickness of at least about 10 microns to at most about 50 microns and comprising additional consecutive image features of the 3D digital model of the ceramic filter.

Operation 802 may be followed by operation 804, which represents forming each section of the plurality of sections of the 3D digital model of the ceramic filter consecutively on top of a previous section. The forming may comprise forming each section of the plurality of sections of the 3D digital model of the ceramic filter with the plaster to additively manufacture the mold of the ceramic filter to subsequently cast the ceramic filter. For example, the first digital layer comprising the image of the faces forming the outlet surfaces of the pores arranged in the bottom uniform array may be formed. For example, the first digital layer may be laser sintered of a plaster. Each additional consecutive digital layer may be consecutively laser sintered of the plaster on top of a previous laser sintered layer to form a mold of the ceramic filter.

Process 800 may be completed at operation 806, which represents casting the ceramic filters.

Example Pore Arrangement

Figure 9:
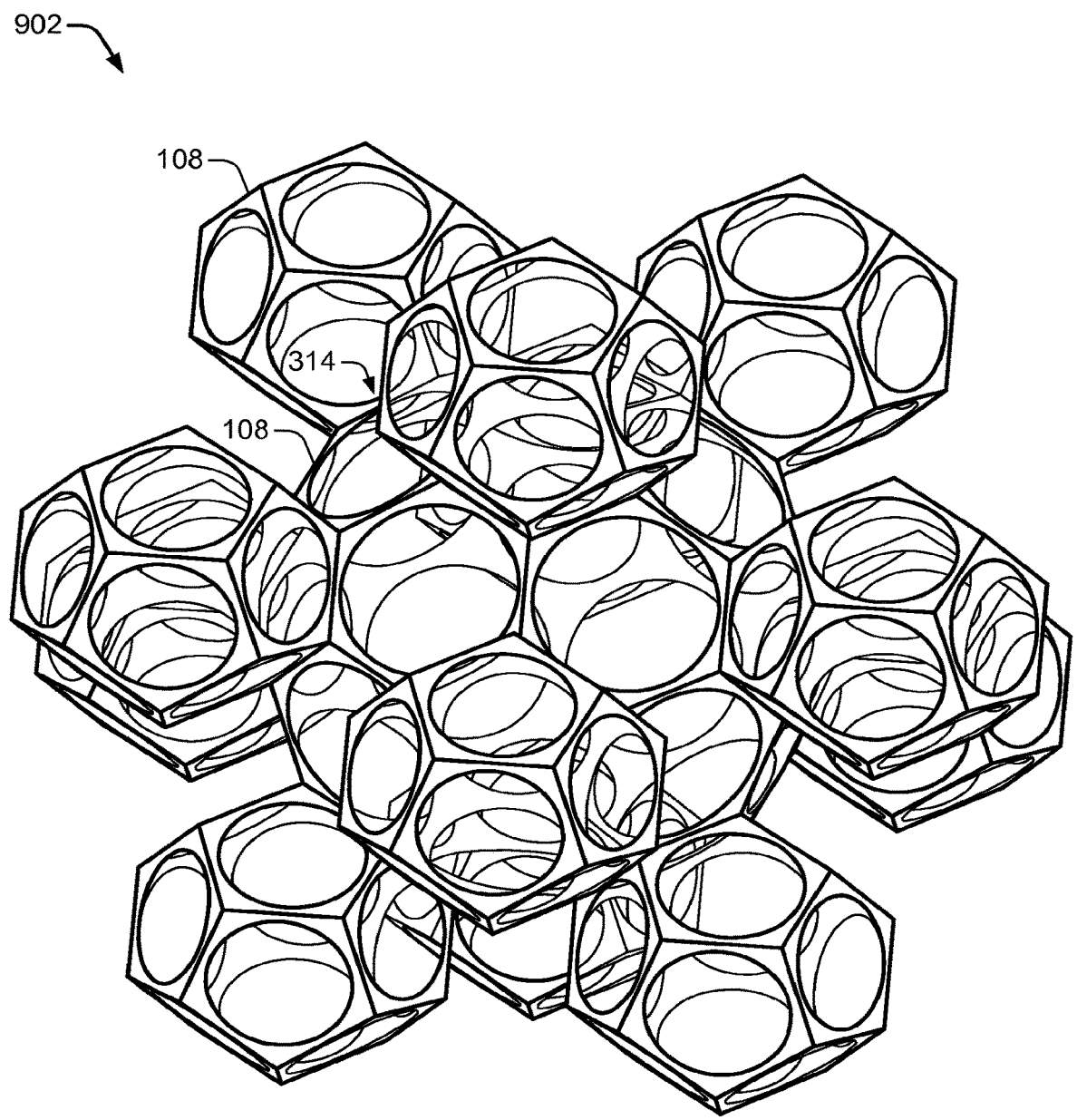
FIG. 9 illustrates an embodiment of pores that may be chosen and digitally modeled to produce desired eddies and/or vortexes in a given liquid and contamination.

FIG. 9 illustrates an embodiment 902 of pores 108 that may be chosen and digitally modeled to produce desired eddies and/or vortexes in a given liquid and contamination. For example, the embodiment 902 of the pores 108 may be chosen and digitally modeled to produce a torturous path through fluid entrances (e.g., window, opening, aperture, etc.) of each of the pores 108. The embodiment 902 illustrates a pore 108 (e.g., a central pore) having a plurality of pores 108 arranged with apertures 314 of the central pore. For example, each pore 108 arranged around the central pore may interface at apertures 314. The apertures 314 of the pores 108 may have substantially the same diameters.

Depending on the specific application, the embodiment 902 may be chosen and digitally modeled to produce desired eddies and/or vortexes in a given liquid and contamination. For example, a plurality of the embodiments 902 may be arranged between an inlet surface and an outlet surface such that the plurality of pores 108 produce a tortuous path for a liquid flowing from the inlet surface to the outlet surface to provide effective depth filtration for a given liquid and contamination.

CONCLUSION

Although the disclosure uses language specific to structural features and/or methodological acts, the claims are not limited to the specific features or acts described. Rather, the specific features and acts are disclosed as illustrative forms of implementing the invention. For example, the various embodiments described herein may be rearranged, modified, and/or combined. As another example, one or more of the method acts may be performed in different orders, combined, and/or omitted entirely, depending on the type of ceramic filter to be additively manufactured.

What is claimed is:
1. An additively manufactured filter comprising:
a plurality of material layers of a three-dimensional (3D) digital model, each material layer of the plurality of material layers of the 3-D digital model consecutively added to a previous material layer and defining a single unit of the consecutively added material layers, the single unit of the consecutively added material layers having an inlet surface opposite an outlet surface;
the plurality of material layers defining a plurality of pores arranged between the inlet surface and the outlet surface, the plurality of pores decreasing in size continuously from the inlet surface through intermediate ones of the plurality of pores to the outlet surface; and
further wherein there are apertures defining pathways between adjacent pores, from the inlet surface to the outlet surface.

2. The additively manufactured filter of claim 1, wherein adjacent pores within the plurality of pores are arranged between the inlet surface and the outlet surface such that adjacent pores are interconnected by apertures therebetween.

3. The additively manufactured filter of claim 1, wherein each of the plurality of pores have a geometry configured to filter particulates from a liquid.

4. The additively manufactured filter of claim 1, wherein each of the plurality of pores have a geometry configured to filter particulates from a gas.

5. The additively manufactured filter of claim 1, wherein the material comprises a ceramic.

6. The additively manufactured filter of claim 1, wherein the geometry is configured with precise chosen opening size, configuration, shape, orientation or interconnection with other pore openings, for a predetermined filtration or hydrodynamic effect.

7. The additively manufactured filter of claim 1, wherein each of the plurality of pores decrease in size continuously from the inlet surface through intermediate ones of the plurality of pores to the outlet surface.

* * * * *